P. A. HABERL & E. F. WARREN.
FLY ROD TIP.
APPLICATION FILED JUNE 2, 1914.
1,149,131.
Patented Aug. 3, 1915.
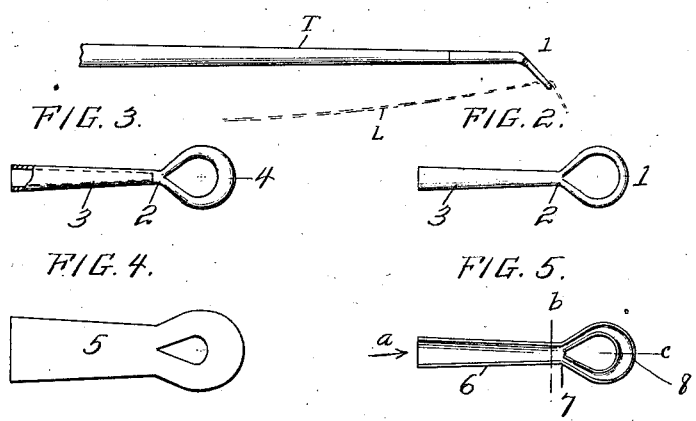
  
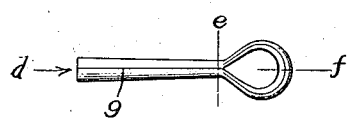 
 
Witnesses
A. C. Newkirk
N. L. Collamer
Inventors
Paul A. Haberl
Edgar F. Warren
By Mason Fenwick Lawrence
Attorneys

UNITED STATES PATENT OFFICE.

PAUL A. HABERL AND EDGAR F. WARREN, OF DENVER, COLORADO.

FLY-ROD TIP.

1,149,131.  Specification of Letters Patent.  Patented Aug. 3, 1915.

Application filed June 2, 1914. Serial No. 842,516.

*To all whom it may concern:*

Be it known that we, PAUL A. HABERL and EDGAR F. WARREN, citizens of the United States, residing at Denver, in the county of Denver and State of Colorado, have invented certain new and useful Improvements in Fly-Rod Tips; and we do hereby declare the following to be a full, clear, and exact description of the invention, such as will enable others skilled in the art to which it appertains to make and use the same.

This invention relates to rods such as used for fishing, and more especially to the tips thereof; and the object of the same is to provide such a tip at its outer end with an improved form of eye so shaped and disposed with reference to the tip itself that it will be almost impossible for the line to catch around it.

In the detailed construction of the eye, further objects and advantages are attained as set forth in the following specification.

In the drawings hereto attached: Figure 1 is a side elevation of a portion of the tip with the simplest form of our improved eye attached thereto, Fig. 2 is a plan view of the eye which is shown in Fig. 1, Fig. 3 is a plan view of a slightly different form of eye. Fig. 4 is a plan view of a blank from which a tubular or hollow eye may be made, and Fig. 5 is a plan view of this blank after it has been partly bent as shown by the detail sections in Figs. 6, 7 and 8, the latter being taken from the point *a* in Fig. 5 and on the lines *b* and *c*. Fig. 9 is a bottom plan view of the finished eye made according to this method, Fig. 10 is a detail of the end view thereof looking in the direction of the arrow *d* in Fig. 9, and Figs. 11 and 12 are detail sections on the lines *e* and *f*.

The pole tip T may be of metal or wood, and as generally understood it is the outer length of a folding or separable fish pole or fly rod. As usual the line, indicated at L in Fig. 1, leads from a reel near the hand of the operator, along the length of the pole and its tip, through an eye at the outer extremity of the latter, and thence to the hook, fly, or spoon. These lines are twisted or braided, and in casting a fly or in ordinary fishing they often become wet so that they have a tendency to coil or kink when the stretch from the eye to the water is not under tension, this tendency being perhaps more pronounced with a new line. We have found that in casting and sometimes in playing a fish, it frequently occurs that a loop or bight in the line will fall over the eye at the outer end of the tip, and subsequent tension on the line will produce a perfect half-hitch so that the line can neither be reeled in or paid out. The results are of course disastrous to the line and the rod. The purpose of the present invention is to produce an eye for attachment to the outer extremity of the tip which will avoid the probability of a half-hitch in the line catching thereon, while yet permitting the free run of the line through it while either reeling it in or paying it out. Broadly stated, this consists in making the eye substantially pear-shaped and uniting its smaller end with a ferrule which slips over the extremity of the tip, the eye proper standing in a plane about 45° to the axis of the tip and normally depending therefrom when the rod is in use. We have shown several embodiments of this idea in the drawings attached.

In Figs. 1 and 2 the eye broadly designated by the numeral 1 is of pear-shape as shown, practically semi-circular for about its outer half, and with its sides converging throughout its inner half into a narrow and in this case solid neck 2, yet beyond which is tubular so as to constitute a ferrule 3. The latter is slipped over the extremity of the pole tip T, and secured thereon by any suitable means forming no part of the present invention.

In Fig. 3 is shown a slight modification wherein the eye is of substantially the same shape, as are the neck and ferrule above described, but the material at the outer end or extremity of the eye is thickened or enlarged as at 4. In either case the line passes along beneath the pole and tip T as indicated by dotted lines L in Fig. 1, through the eye, and onward. It will be obvious that the point of greatest wear on the metal of which the eye is composed is just where the line rides over it, and the modification illustrated in Fig. 3 consists in making the eye larger or heavier at this point.

In Fig. 4 is shown a blank 5 from which a hollow eye may be made, and in Fig. 5 the same blank is shown as given its first treatment so that its ferrule end 6 is reduced to a semi-circular shape as seen in Fig. 6, its neck 7 has the shape shown in Fig. 7, and its outer end 8 has the shape shown in Fig. 8. Here again we have shown this outer end as slightly larger than the sides of the eye proper. In Fig. 9 the partly finished device illustrated in Fig. 5 is finished, and it will be observed that the seam 9 extends along the center of the bottom of the ferrule 6, past the neck, and completely around the bottom of the eye. Figs. 10, 11 and 12 give views of this product on the lines $d$, $e$ and $f$ of Fig. 9. It is to be understood that when in use the seam 9 is at the bottom and the entire eye stands downward from the ferrule at an angle preferably of about 45° as seen in Fig. 1. The result is that the line nowhere comes in contact with the seam and cannot be worn thereon.

The metal of which any form of this improved eye is made, is not important. As to its size, we would make it as small as possible consistent with the size of line which is to be used and with the strength desired. We consider it important that the sides of the eye from its rounded outer end to its neck shall be substantially straight so that the entire eye when viewed from above presents an outline which may be said to be pear-shaped, the sides merging nicely into the neck, from which point the ferrule gradually increases in size so to conform with the shape of the tip T. It will be found that when a pole tip is equipped with an eye of this character, not only does the line run free through it under all conditions and circumstances, but if the angler in casting the line should accidentally form a half-hitch or loop which drops over the pole tip, the shape of the eye will permit it to slip off the same when tension is applied. In other words, the eye has its sides merging integrally into its shank, it depends at an inclination from such shank, and especially it nowhere possesses sharp angles or corners on which the line can catch, and their absence also avoids the disagreeable catching of the pole tip in twigs, wire fences, and other obstructions.

What we claim as new is:—

1. The combination with a pole tip, of a pear-shaped eye secured at its smaller end to the extremity of the tip and with the plane of its body standing at an angle between 1° and 90° to the axis of said tip.

2. The combination with a pole tip, of a metallic eye of pear-shaped configuration having an integral ferrule projecting from the meeting ends of its straight sides on a line about 45° to the plane of the body of the eye, for the purpose set forth.

3. An eye for fly rod tips consisting of a ferrule merging into a neck, a pair of straight sides integral with and diverging from said neck, and a semi-circular outer end connecting said sides, the diameter of the outer end being larger than that of either side.

4. The herein described eye for fly rod tips stamped from a single blank of sheet metal and comprising a ferrule and a pear-shaped eye proper, the smaller end of the ferrule and eye being integrally united and these elements standing at an angle of about 45° to each other, the edges of the blank meeting each other on the inside of said angle.

5. The herein described eye for fly rod tips stamped from a single blank of sheet metal and bent into a ferrule and an eye proper integrally united and standing at an angle of about 45° to each other, the edges of the blank meeting each other on the inside of said angle.

6. An eye for fly rod tips made from a single blank of sheet metal and bent into a ferrule, a neck into which the ferrule merges, a pair of straight tubular sides diverging from said neck, and a semicircular tubular outer end connecting said sides, the diameter of the outer end being larger than that of either side and the edges of said blank meeting each other along the center of the bottom of all the elements named.

7. The herein described line guide for pole tips comprising an eye having a pear-shaped external contour with its pointed end attached to the pole.

8. The herein described line guide for fly rod tops comprising a ferrule for attachment to the tip, and an eye of pear-shaped external contour with its pointed end merging integrally into said ferrule.

In testimony whereof we affix our signatures in presence of two witnesses.

PAUL A. HABERL.
EDGAR F. WARREN.

Witnesses:
ALBERT L. VOGL,
CARLE WHITEHEAD.